United States Patent [19]

Pike et al.

[11] 4,018,642

[45] Apr. 19, 1977

[54] MICROWAVE CURING OF ALKALINE PHENOLIC RESINS IN WOOD-RESIN COMPOSITIONS

[75] Inventors: Robert L. Pike; Derek Barnes, both of Vancouver, Canada

[73] Assignee: MacMillan Bloedel Limited, Vancouver, Canada

[22] Filed: Sept. 8, 1975

[21] Appl. No.: 610,923

[52] U.S. Cl. .......................... 156/272; 144/281 C; 219/10.53; 219/10.55 A; 219/10.55 M

[51] Int. Cl.$^2$ .......................................... B29C 19/02

[58] Field of Search .......... 156/272, 273, 380, 335; 219/10.55 A, 10.53, 10.55 R, 10.55 M; 144/281 C; 427/45; 264/26

[56] References Cited

UNITED STATES PATENTS

| | | | |
|---|---|---|---|
| 2,834,705 | 5/1958 | Marcucio et al. | 156/273 |
| 3,519,517 | 7/1970 | Dench | 219/10.55 M X |
| 3,769,127 | 10/1973 | Goldsworthy et al. | 156/273 X |

OTHER PUBLICATIONS

"Possible Uses of Microwaves for Industrial Heating", Product Engineering, Jan. 1947.

*Primary Examiner*—David A. Simmons
*Attorney, Agent, or Firm*—Sim & McBurney

[57] ABSTRACT

Microwave energy applied to a wood-resin composition such as plywood is used to cure the resin in a very short time, as compared with a conventional hot press process, and yet avoids the arcing and tracking problem that results when R.F. dielectric heating is used to reduce cure time. Pressure is applied to the plywood or other article being made either simultaneously with the microwave energy or shortly after the lather has been applied.

12 Claims, 2 Drawing Figures

MICROWAVE CURING OF ALKALINE PHENOLIC RESINS IN WOOD-RESIN COMPOSITIONS

BACKGROUND OF THE INVENTION

This invention relates to methods for curing resins that are used as binders or adhesives for materials such as wood particles, wood chips, wood wafers, wood strips, wood fibres and wood veneers, for example. The invention is particularly applicable to the production of chip board, hard board, particle board, wafer board, plywood and products of the type described in Canadian Patent No. 966,409 issued on Apr. 22nd, 1975, and assigned to MacMillan Bloedel Limited, but it is to be understood at the outset, even though the subsequent disclosure will be with respect to wood-glue mixtures, that other materials commonly used as glue fillers, and reinforcing materials such as fiberglass, metal, cement, etc., in whatever form they may take, can be included.

Wood products of the type hereinbefore noted classically are made by being subjected to heat and pressure in a hot press. This process is time consuming and hence costly. For example, 13/16 inch thick sheet of exterior grade plywood composed of seven plies of Douglas fir veneer dried to less than 7% moisture content and glued together with 56 lbs. of phenol formaldehyde glue per 1000 sq. ft. of double glue line typically requires a residence time of 7½ min. at 200 p.s.i. and 300° F. The time consuming nature of the process arises from the fact that wood is a relatively poor conductor of heat, and the heat from the platens of a hot press can only be directed against the outer surfaces of the wood product being formed. Consequently, considerable time is required for the amount of heat necessary to cure the resin to penetrate to the centre of the wood product being formed. While it may be possible to reduce the time consumed by increasing the platen temperature, there is an obvious temperature limit imposed by the necessity to avoid scorchng or charring the outer surfaces of the wood product being formed. In addition, higher temperatures may be more difficult and expensive to obtain requiring greater steam pressures and additional equipment. It also should be noted that at higher temperatures water may be entrapped causing stream explosions.

In an effort to reduce the time required to cure the resin, numerous attempts have been made using R.F. energy, i.e., dielectric heating. In many cases, where the resin is in layers, as in plywood, for example, the parallel heating techniques has been employed because the resin tends to heat preferentially to the wood. In this technique the electric field is parallel to the glue line. It has been observed repeatedly, where the parallel heating technique has been used, and where the resin has been an alkaline solution of phenol formaldehyde resin, that arcing and tracking in the resin takes place, and that the problem is more acute the thicker the resin layer. The reason for this undesirable phenomenon appears to be the relatively high conductivity of such resins which leads to breakdowns when subjected to R.F. fields having the strength required to obtain relatively short cure times. The arcing and tracking phenomenon can be reduced and perhaps even eliminated if the R.F. field is applied transverse to the glue line, but this reduces the efficiency of the operation because of the increased energy required per unit volume, this being due to the necessity to heat fully both the wood and the resin, and increases the cost of the process.

It also has been observed that reasonable curing times using R.F. energy can be obtained where acidic phenol formaldehyde resins are employed, but these resins have inferior ageing properties, at least in many cases.

Likewise the R.F. arcing problem has been shown to be reduced if a resorcinol resin is added to the alkaline phenolic resin, but this undesirably increases the overall resin cost.

As a consequence of their characteristics and cost, phenol formaldehyde resins dissolved in aqueous alkaline solutions hereinafter called alkaline phenolic resins, are in widespread use throughout the world in wood-resin products of the type noted beforehand. The problem of satisfactorily curing these resins in a shorter time than is possible in a hot press remains extant.

SUMMARY OF THE INVENTION

In accordance with one aspect of this invention it has been discovered that microwave energy can be used very successfully to cure the adhesive of a composite mass comprising an adhesive whose rate of cure is accelerated by the application of heat and wood in some form. It has been found that much shorter cure times are required than with the hot press technique and, notwithstanding this, arcing and tracking do not result. The method of this invention not only is superior to the use of R.F. energy for this reason, but also because it can be applied to thick sections and irregular shapes. In this respect, if R.F. energy is applied with plates of a given size, while it has been found that increasing the frequency of the R.F. field permits lower voltage and reduces arcing and tracking, at the same time a more uneven electric field is produced because of standing waves, resulting in uneven heating. This can be overcome by reducing the size of the plates, but, of necessity, the size of the product being formed also must be reduced or a series of plates used.

While it is known to use microwave energy in the drying of lumber and in the drying of paper impregnated with phenolic resins, we are not aware of anyone ever having used microwave energy for curing adhesives of the aforementioned type, particularly alkaline phenolic resins in a wood-glue mixture or having appreciated the attendant advantages thereof.

In accordance with this invention there is provided a method for making a composite product from a composition comprising wood and a binder for the wood, the binder comprising an alkaline phenolic resin whose rate of cure is accelerated by the application of heat which, the method comprising locating the composition in juxtaposition with respect to a waveguide such that microwaves propagating through the waveguide in the form of a travelling wave will propagate through the composition, and propagating a microwave having a frequency of at least 100 MHz through the waveguide and the composition to heat the resin and accelerate its curing, pressure being applied during the application of microwave energy or shortly thereafter.

BRIEF DESCRIPTION OF THE DRAWINGS

This invention will be better understood by reference to the following detailed description, taken in conjunction with the appended drawings, in which.

DETAILED DESCRIPTION OF THE INVENTION INCLUDING THE PREFERRED EMBODIMENT

Figures 1, 2:
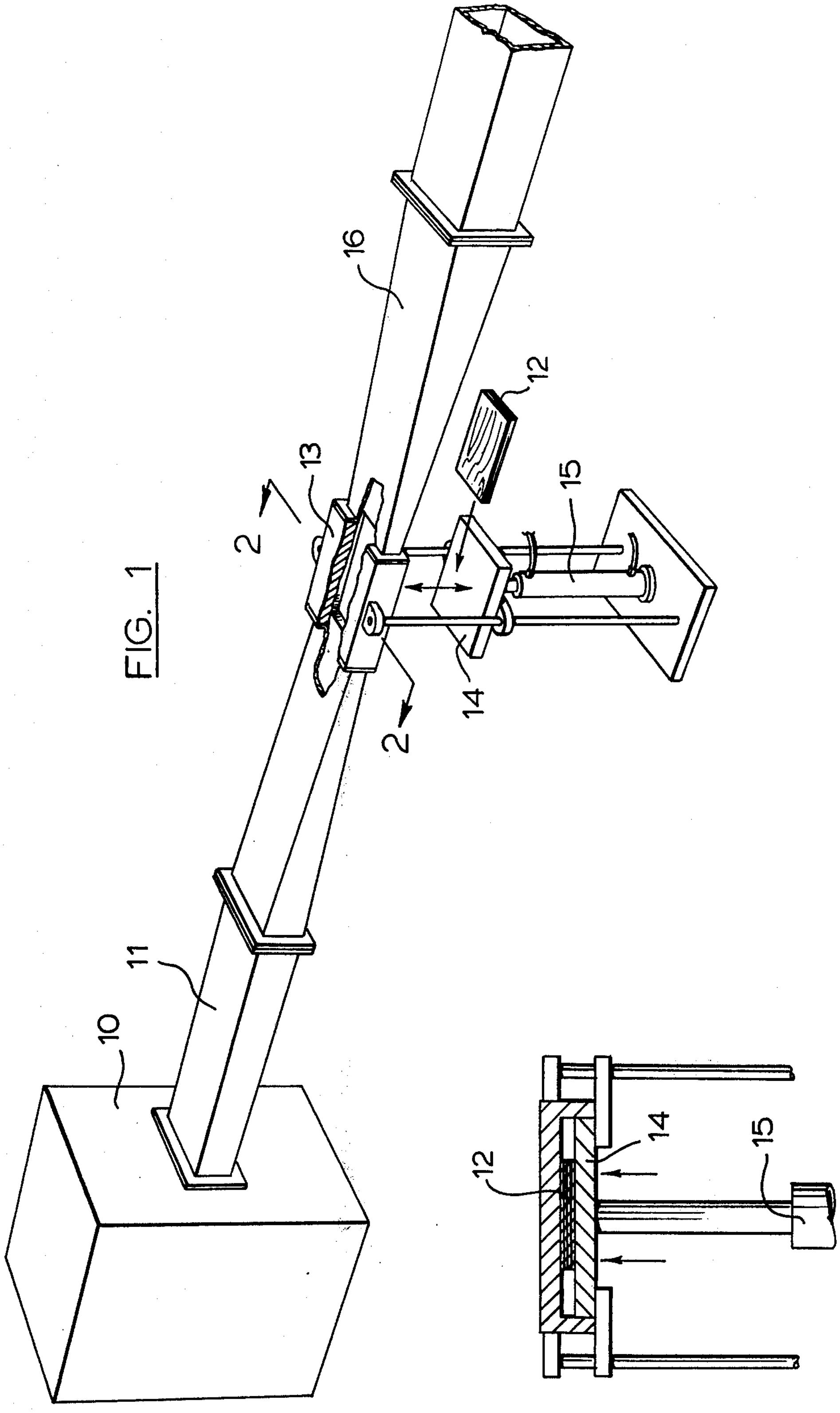
FIG. 1 is a schematic representation in perspective of apparatus which may be used in practising this invention, and, FIG. 2 is a section taken along line 2—2 in FIG. 1.

In the practice of this invention a waveguide is employed and microwaves in the form of a propagating, electromagnetic, travelling wave are conducted through the waveguide to the work product. In Canada and the United States D.O.T. and F.C.C. regulations dictate that for industrial microwave applications frequencies of 915 MHz or 2450 MHz must be employed. In other countries different frequencies may be allocated. In general it has been found that frequencies as low as 100 MHz can be employed, if their use is permitted. The upper frequency limit is not critical and is set by practical considerations, since there is a direct relationship between the optimum size of a waveguide and the frequency of the electromagnetic wave that can be conducted through it. Practically speaking, 10,000 MHz is a reasonable upper limit although at this frequency, the penetration of the microwave energy in the work product would be quite restricted.

Referring to FIG. 1, there is shown a conventional microwave power source 10 which, in experiments which have been conducted to establish the practicality of this invention, was an Eimac* Power Pack PPL-25 having a power output of 25 Kw and operating at 915 MHz. (*trade mark)

A rectangular waveguide 11 communicates with power source 10 and conducts the microwave energy to the work product 12 which, in the present case, is a piece of plywood.

The simultaneous application of microwave energy and pressure is preferred, and the latter is achieved in the illustrated embodiment by means of a press having a fixed upper platen 13, a movable lower platen 14 and a hydraulically operated cylinder 15 to move lower platen 14 towards and away from upper platen 13.

Upper platen 13 is generally U-shaped in cross-section, and lower platen 14 is of such a size that when it is moved adjacent upper platen 13 it fits between the downwardly extending arms thereof, thereby providing a rectangular configuration of essentially the same shape as waveguide 11. The press thus constitutes an extension of waveguide 11 through which the microwaves can propagate. A waveguide 16 similar to waveguide 11 is located opposite to waveguide 11 on the other side of the press and similarly cooperates with the press to permit continued propagation of the microwaves. Waveguide 16 may be provided with a conventional water load (not shown) to absorb any remaining microwave energy or may be otherwise terminated in any conventional manner, preferably in such a way as to minimize reflections that would set up standing wave patterns that could create hot spots in the work product.

In use the press is opened, work product 12 is placed on lower platen 14, the press is closed and power source 10 is turned on. Work product 12 is left in the apparatus until the adhesive has cured. The length of time this will take depends upon such factors as the mode of propagation in the waveguide, frequency, power applied the position and orientation of the work product in the waveguide and work product characteristics and size. Thus, for example, penetration depth is a function of the moisture content of the work product, and for high moisture contents lower frequencies may be desirable, whereas with low moisture contents higher frequencies can be employed with satisfactory penetration. Generally speaking, higher frequencies are preferred because, for the same power input, the strength of the electric field is less and the possibility of breakdown is less. In a less preferred embodiment the required pressure may be applied after the adhesive has been heated by the microwave energy. In this case pressure must be applied before the adhesive has cured to the point where it is no longer possible to obtain a good bond.

It is well known that microwaves can propagate through waveguides in various modes, and it is desirable to choose a mode or combination of modes that provides the most uniform electric field over the work product. In the $TE_{10}$ mode the electric field is strong at the centre of the waveguide and weak adjacent the side edges. If the work product occupies only the central area of the waveguide, it will be in a region of reasonably uniform electric field.

In the aforementioned experiments the $TE_{10}$ mode was employed with the electric field vector being transverse to the glue lines, but other experiments were carried out with equal success with the electric field vector parallel to the glue lines. No determination was made as to whether one technique was more efficient than the other, but in neither case was any arcing or tracking observed using 915 MHz even with cure times as low as 20 seconds the work product being plywood composed of ⅛ inch thick Douglas fir veneers and alkaline phenolic resin.

It should be noted that the voltage gradient in the work product that may be safely used rarely exceeds 4000 volts/inch and may be as low as 1000 volts/inch if considerable moisture is present in the wood or adhesive. It can be shown that the minimum cure time at 915 MHz is 1/8.3 times the minimum cure time at 30 MHz assuming the breakdown field strength to be the same at both frequencies.

In the practice of this invention the type of adhesive which is employed preferably is an alkaline phenolic resin. However, it may be any adhesive whose rate of cure is accelerated by the application of heat. Successful experiments have been conducted using both alkaline phenolic resins and urea formaldehyde resins.

The pressure applied to the wood product may vary depending on a number of factors and, in this respect, is no different than in the conventional manufacture of plywood using a hot press. A typical pressure is 200 p.s.i.

While the process as described herein is a batch process, it is contemplated that by incorporating a rotary continuous press within the waveguide, it should be possible to create a continuous process.

In order to demonstrate the practicability of this invention five small (3 inches × 6 inches) 3 ply plywood assemblies each ⅜ inch thick bonded with alkaline phenolic resin were stacked and processed in apparatus of the type illustrated. Each ply was a Douglas fir veneer 1/10 inches thick, and the middle ply of each panel was coated with a 50 lb./MDGL spread level of Borden's* W838 phenolic adhesive. (*trade mark) The results are summarized as follows:

Bond quality — similar to conventional hot press practice.

Press time — 20 seconds as compared to a hot press time of 18 minutes at 300° F for 1½ plywood.

Energy/unit volume — 1.5 to 2.0 KWH/ft³ at 915 MHz.

Penetration depth — 10 to 15 inches.

Press pressure — 200 p.s.i. — same as plywood mill.

While the instant invention has been described in connection with the manufacture of plywood, as indicated beforehand it is equally applicable to other wood-adhesive products. In some cases, e.g., in the case of the product described in the aforementioned Canadian patent, it may be necessary to apply pressure to all sides of the work product, but this can be accomplished readily by a press having a movable lower (or upper) platen and a movable side platen.

While preferred embodiments of this invention have been disclosed herein, those skilled in the art will appreciate that changes and modifications may be made therein without departing from the spirit and scope of this invention as defined in the appended claims.

What we claim is:

1. A method for making a composite product from a composition comprising wood and a binder for said wood, said binder comprising an alkaline phenolic resin whose rate of cure is accelerated by the application of heat, said method comprising locating said composition in juxtaposition with respect to a waveguide such that microwaves propagating through said waveguide in the form of a travelling wave will propagate through said composition, propagating a microwave having a frequency of at least 100 MHz through said waveguide and said composition to heat said resin and accelerate its curing, and applying pressure to said composition before said resin has cured.

2. A method according to claim 1 wherein said frequency is less than 10,000 MHz.

3. A method according to claim 2 wherein said frequency is 915 MHz.

4. A method according to claim 2 wherein said frequency is 2450 MHz.

5. A method according to claim 1 wherein said product is plywood and said wood is in the form of sheets laminated together by said resin.

6. A method according to claim 5 wherein said microwaves have an electric field vector that is substantially perpendicular to said sheets and the layer of resin therebetween.

7. A method according to claim 5 wherein said microwaves have an electric field that is substantially parallel to said sheets and the layers of resin therebetween.

8. A method according to claim 1 wherein said product is particle board.

9. A method according to claim 1 wherein said product is chip board.

10. A method according to claim 1 wherein said product is wafer board.

11. A method according to claim 1 wherein said wood is in the form of a bundle of fibres having top, bottom and side edges and said pressure is applied to said top, bottom and side edges.

12. A method according to claim 1 wherein said pressure is applied simultaneously with propagation of said microwave through said composition.

* * * * *